Jan. 4, 1944.  H. E. MALONE  2,338,123
CONTROL APPARATUS
Filed Nov. 9, 1940  2 Sheets-Sheet 1
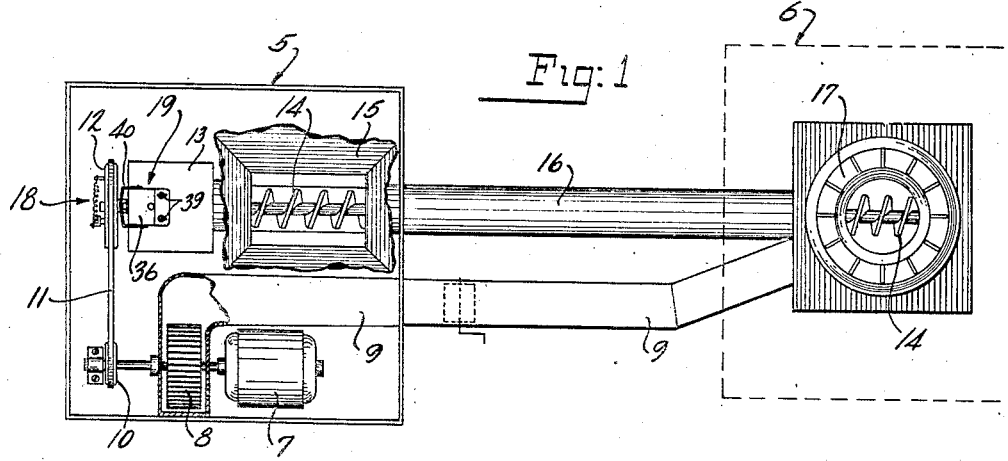
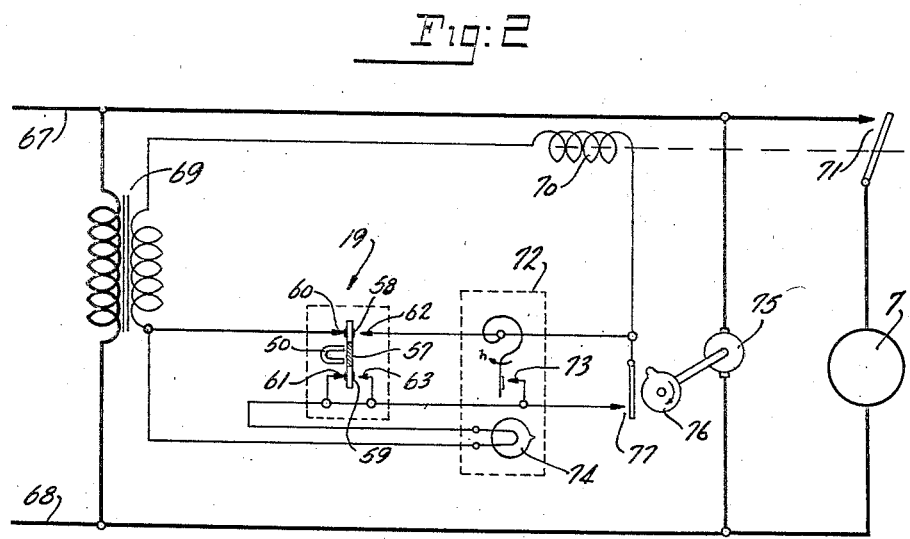
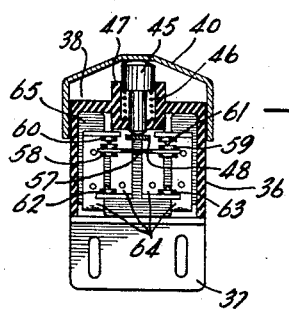
INVENTOR.
Homer E. Malone
BY
ATTORNEY.

Jan. 4, 1944. H. E. MALONE 2,338,123
CONTROL APPARATUS
Filed Nov. 9, 1940 2 Sheets-Sheet 2
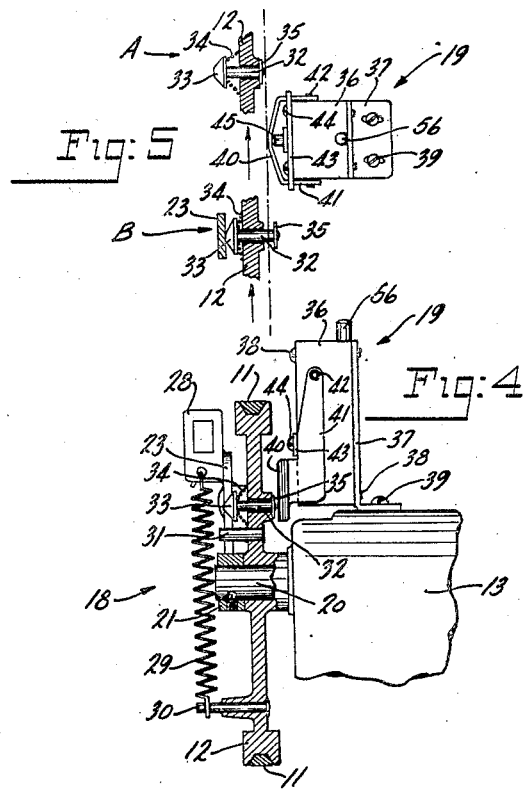
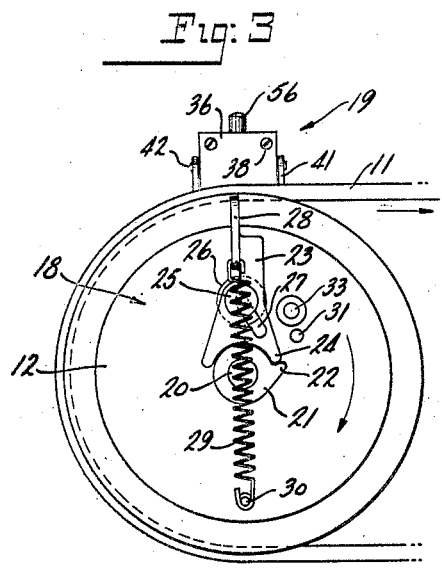
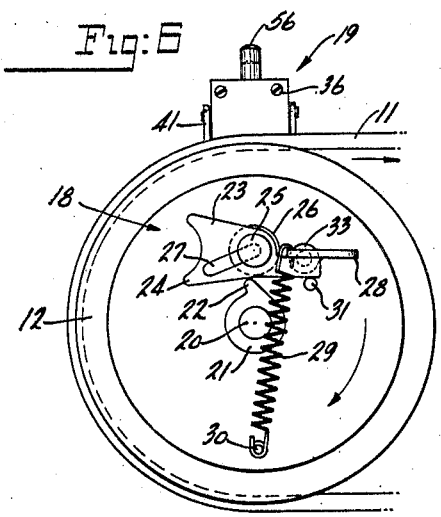
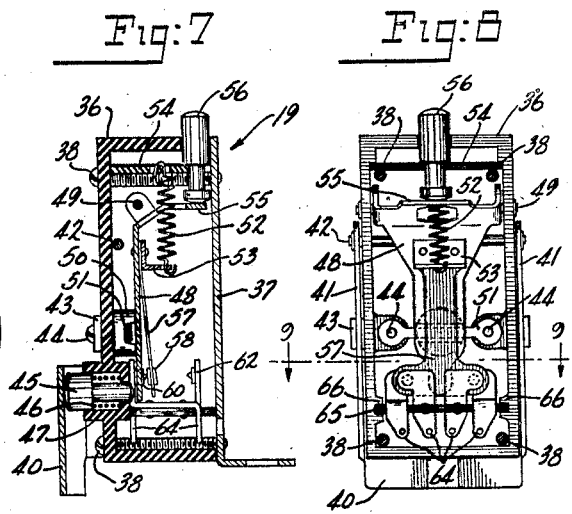
INVENTOR.
Homer E. Malone
BY
ATTORNEY.

Patented Jan. 4, 1944

2,338,123

UNITED STATES PATENT OFFICE 2,338,123

CONTROL APPARATUS

Homer E. Malone, Milwaukee, Wis., assignor to Perfex Corporation, Milwaukee, Wis., a corporation of Wisconsin Application November 9, 1940, Serial No. 365,133

7 Claims. (Cl. 192—150)

This invention relates in general to control apparatus and more particularly to an arrangement for automatically controlling the operation of a mechanism in the event that abnormal conditions occur during normal operation.

It is an object of the invention to provide a control apparatus which in the event of abnormal conditions existing in a mechanism, the driving means therefor is automatically stopped and an indication of the abnormal condition is given, together with means whereby the apparatus is manually resettable when the abnormal condition has been corrected.

A further object is to provide an improved overload responsive apparatus which is simple in construction, readily accessible and installed, reliable in operation, and which is easily resettable.

The invention is applicable for use as a control apparatus for controlling various operating mechanisms. In one of its uses it is adapted to control the operation of a stoker operated furnace for example. As is well known, the stoker apparatus comprises a motor driven fuel feeding screw for feeding fuel to the retort of a furnace, and a fan driven by the motor for promoting combustion of the fuel. The stoker is automatically operated in response to demands for heat from the furnace. In the usual operation of the stoker the fuel feeding screw feeds the fuel from a hopper through a relatively long conveyer tube to the retort. As is well known, it is difficult to prevent foreign objects, such as pieces of metal, nails, etc., from becoming intermixed with the fuel and passing into the screw conveyer and causing jamming or stoppage of the stoker apparatus. It has been customary in the past to provide a shear pin in the connection between the motor and fuel screw which is broken when an obstruction such as that pointed out has been encountered. In this form of overload release device while the feeding of fuel is stopped, the motor and fan would continue to run until the shear pin was replaced or the motor was stopped when the call for heat had been satisfied.

The objection to the foregoing arrangement was that the motor would continue to run without a load and the fan would continue to blow combustion air to the furnace retort, causing the fuel thereon to burn rapidly and result in the fire burning itself out. In this type of an arrangement it has also been difficult to determine when a shear pin has been broken, since the only knowledge that a householder would have that this condition existed was when the fire was out.

It is accordingly an object of the invention to provide a control apparatus in which the necessity for providing shear pins is eliminated and in which the motor and fan are automatically stopped when an overload condition exists.

A further object is to provide an overload resetting mechanism in which upon the occurrence of an overload condition, an indication is immediately given of such condition existing.

A further object of the invention is to provide a control apparatus combining an electric switch which is automatically operated upon the occurrence of an overload condition to stop the operation of a motor and to give an indication of such stoppage.

A further object is to provide a control arrangement in which the mechanism is readily reset for operation.

Other objects and advantages of the improved control apparatus reside in certain novel features of construction, arrangement and combination of the various elements which will be hereinafter more fully described, particularly pointed out in the appended claims and illustrated in the accompanying drawings, in which:

Fig. 1 illustrates the use of the control apparatus as applied to a stoker operated furnace;

Fig. 2 is a schematic circuit arrangement incorporating the invention as applied to the stoker apparatus of Fig. 1;

Fig. 3 is an elevational view of the overload release mechanism;

Fig. 4 is a partial cross-sectional side view of the overload release mechanism.

Fig. 5 is a top view of Fig. 4 showing an operating sequence;

Fig. 6 is an elevational view of the overload release mechanism in its tripped position;

Fig. 7 is a cross-sectional side view of the control switch mechanism;

Fig. 8 is a rear view of the switching mechanism; while

Fig. 9 is a cross-sectional top view taken along the line 9—9 of Fig. 8.

Referring now particularly to Fig. 1, the invention is illustrated in one of its applications as applied to a stoker operated furnace. The stoker apparatus is indicated generally at 5 while the furnace and retort mechanism is indicated generally at 6. An electric motor 7 for operating the stoker is provided with a fan 8 coupled to its shaft for forcing combustion air through the air conduit 9 to the furnace retort. A pulley 10 is fastened on the shaft of the motor 7 and drives a belt 11 which is coupled with a drive wheel 12. This wheel is mounted on the power shaft of a reduction gear box 13 which is arranged to rotate a fuel feeding screw 14 which feeds the fuel from a hopper 15 through a conveyer tube 16 to the furnace retort 17.

The foregoing stoker apparatus and arrangement may take various forms in their commercial application, and the one illustrated is shown merely for example as being of a conventional type. In this conventional arrangement the motor 7 drives the fan 8, and in turn through the belt 11 and gear box 13 the stoker screw 14 is driven so that the fuel feeding and air feeding take place at the same time. According to the invention, means are provided for stopping the operation of the motor and stoker apparatus in the event that an abnormal condition or an obstruction in the conveyer screw 14 takes place. This overload release mechanism is indicated in Fig. 1 at 18. The means for signalling the existence of the overload condition and for stopping the operation of the stoker apparatus is indicated generally at 19.

Referring now particularly to Fig. 3, the overload releasing mechanism 18 is arranged generally upon the driving wheel 12. The wheel 12 is mounted upon a shaft 20 for driving the gears in the gear box 13. A cam element 21 is secured to the end of the shaft 20 by means of a set screw and is provided at one point of its periphery with a protruding catch element 22. Also arranged upon the face of the drive wheel 12 is an overload releasable and manually resettable trip member 23 which is provided at one end with a pair of diverging extensions, one of which, 24 is arranged to engage the catch member 22. The portion of the trip member 23 between the two extensions is formed and adapted for sliding engagement with the periphery of the cam 21. The trip member 23 is pivoted on a pin 25 fastened into an integral bushing 26 projecting from the face of the wheel 12. The pivot pin 25 rides in a slot 27 formed in the trip member 23 for a purpose which will be pointed out. At one end the trip member 23 is provided with a resetting finger portion 28 to which one end of a relatively stiff spring 29 is connected. The other end of spring 29 is fastened to a pin 30 mounted in wheel 12. As seen in Fig. 3, the spring 29 is arranged in such a manner that it exerts a pull upon the trip member 23 passing in a direct line through the center of the shaft 20 and exerts its force so as to hold the forked end of trip member 23 with considerable force against a portion of the periphery of cam 21.

The foregoing arrangement is such that as long as the belt 11 rotates the driving wheel 12 in the direction of the arrows, the projection 24 of the trip member 23 remains in engagement with the catch 22 thereby carrying the cam 21 along with the wheel 12 and causing rotation of the shaft 20. The shaft 20 in turn drives the gears in the gear case 13 to operate the fuel conveyer screw 14. As long as operating conditions are normal and no overload condition exists, the arrangement continues to operate in the foregoing manner. The spring 29 has sufficient inherent tension to always hold the trip member 23 tightly against the cam 21 and with sufficient force to enable the fuel screw 14 to pass fuel to the retort 17 from hopper 15.

In the event that some foreign obstruction should pass from the fuel hopper 15 into the conveyer screw 14 and be too large to pass with the fuel through the conveyer tube 16, it would jam between the screw and tube causing a stoppage of the screw 14. This stoppage would manifest itself through the gears in the gear case 13 and prevent rotation of the shaft 20 as well as the cam 21 secured thereto. The motor 7, however, would continue to operate and drive the belt 11 to rotate the drive wheel 12. Since the shaft 20 is now stopped and the wheel 12 continues to rotate, the projection 24 of trip member 23 begins to pivot in the catch 22 to a position where the spring 29 is no longer in a direct line passing through the center of shaft 20. As the trip member 23 rotates further, a position is reached in which the spring 29 exerts a force passing through a line extending between its upper end and the catch 22 and beyond the center of the pivot pin 25. Since the cam 21 remains stationary, the trip member 23 rises and causes its pivot 25 to ride in the slot 27 forcing the portion of the trip member between its diverging projections to disengage from the periphery of cam 21. When the spring 29 has been moved past the position pointed out, the spring quickly snaps the trip member 23 out of engagement of its projection 24 with the catch 22. The trip member rotates about the pin 25 and assumes the position indicated in Fig. 6. The rotation of trip member 23 is halted by a stop pin 31 in the wheel 12. In this position the catch 22 is clear of the projection 24 and the cam 21 is no longer coupled with the driving wheel 21, hence the driving wheel can continue to rotate freely without turning the fuel screw 14.

When the obstruction in the fuel conveyer screw 14 has been removed the trip member 23 is readily resettable by grasping its upper end 28, pulling it outward against the tension of spring 29, and rotating it 90 degrees about pivot pin 25 so that the projecting portions of the trip member are again placed in position on the periphery of cam 21. The foregoing arrangement, it is seen, eliminates the necessity of providing shear pins which must be replaced and facilitates the resetting operation after an overload condition.

Under ordinary conditions this overload release is satisfactory from an operating standpoint. However, it is desirable that the motor operation be stopped since it is not good practice to continue its operation while no fuel is being fed to the retort. In addition, because the fan 8 is coupled directly to the motor 7 it would continue to feed combustion air through the air conduit 9 to the retort 17 causing what fuel remains upon the retort to be rapidly burned away until the fire is completely burned out. This is also not a desirable condition and according to the invention provision is made for stopping the motor 7 when an overload condition exists, and in addition provide means for indicating such condition.

The means for accomplishing the foregoing includes an operating element comprising a pin 32 slidable in a hollow boss formed on the wheel 12 and extending from the front side to the rear side thereof. The pin 32 is provided at the front surface of wheel 12 with a conical shaped head portion 33 which is normally maintained in the path of the tripping movement of the trip member 23 by a compression spring 34 arranged under the head 33. As is more clearly seen in Fig. 5 at A, the spring 34 normally urges the head 33 of pin 32 outwardly from the wheel 12 and when the trip member 23 is tripped it rides over the cam surface of head 33, forcing the pin 32 rearwardly of the wheel 12 as indicated at B. At its rear end the pin 32 is provided with a washer 35. When the trip member 23 is tripped it holds the head 33 in the position shown at B in Fig. 5. The stop pin 31 prevents the trip member 23 when tripped from rotating too far away from contact with the button 33.

The pin 32 when in the position shown at B in Fig. 5 is adapted to actuate switching mechanism indicated generally at 19 for the purpose of operating the same. This switching mechanism is arranged to cause stopping of the motor when an overload condition exists and at the same time provide a means for signalling this condition. The switching mechanism 19 comprises a switch casing 36, preferably formed of some plastic insulating material, having a back plate 37 closing the opening of the casing 36 and attached thereto by means of pairs of screws 38 at the top and bottom ends of the casing. The switching unit 19 is removably secured to the gear casing 13 by means of a pair of screws 39 passing through elongated openings in the back plate 37 and into the gear case 13. An operating lever 40 (Figs. 4, 5 and 9) is carried by the casing 36 and includes an apron shaped lower portion arranged within the path of movement of the pin 32 and washer 35. The operating lever 40 is provided with a pair of supporting arms 41, the ends of which are connected for pivotal movement to the casing 36 by a pin 42. A stop member 43 for limiting the outward movement of the apron of switch lever 40 is arranged upon the front of casing 36 and is adapted to be engaged by the arms 41. This stop member is held in place by a pair of screws 44. The apron portion of switch member 40 is normally urged in an outward direction and is normally in contact with a button 45 having a reduced rearward extending portion which is encircled by a spring 46. The button 45 is adapted for sliding movement within a recessed portion 47 formed in casing 36. The switching mechanism 19 includes an armature member 48 made of magnetic material which is hinged within the casing 36 by pin 49. The armature member 48 is normally biased and held in one of its positions by a permanent magnet 50 supported within the casing 36 by a strap member 51, Fig. 8, in turn held by screws 44. A spring 52 having one end connected to bracket 53 on armature 48 is arranged to hold the armature 48 in its other position after it has been moved out of the influence of magnet 50. The opposite end of spring 52 is connected to an insulating plate 54 arranged in the top of the casing 36 and in turn supported by screws 38. The spring 52 extends freely through an opening formed in the top of the pivoted armature 48. The armature 48 is provided with a transverse portion 55 which is adapted to be acted upon by a resetting button 56 passing outwardly through the top of the casing 36.

The foregoing arrangement generally is such that upon the apron of switch lever 40 being engaged by pin 32 the button 45 forces the armature 48 out of the influence of magnet 50 to a position where the spring 52 can take control and swing the armature outwardly about pivot 49. To move the armature 48 back into position against the magnet 50 the resetting button 56 is momentarily depressed against the tension of spring 52. The spring 52 is arranged so as to have sufficient force to swing the armature away from the magnet 50 after it is once moved by the button 45 but does not have sufficient force to pull the armature away from the magnet when the armature is in engagement therewith.

The movement of the armature 48 carries along with it a contact leaf spring 57, one end of which is secured to the armature lever 48 while the other end is arranged to support a pair of movable contact elements 58 and 59 seen more clearly in Fig. 9. The contact element 58 in its normal position is in contact with a fixed contact 60 while when the lever 57 is moved, contact 58 establishes contact with the fixed contact 62. The movable contact 59 normally engages fixed contact 61 and when switched over is engaged with fixed contact 63. The fixed contacts 60, 61, 62 and 63 are carried upon the ends of individual contact brackets 64 which are supported in any suitable manner upon an insulating plate 65 which is arranged in the bottom of casing 36 and is held in position by means of grooves 66 formed in the sides of casing 36. The spring member 57 is of sufficient flexure so as to provide good slidable electrical contact pressure to the contacts when in engagement therewith, while the magnet 50 and spring 52 produce a snap action movement of the armature 48.

The apparatus described is adapted to be connected for operation in a circuit arrangement such as that shown in Fig. 2. In this circuit arrangement a pair of line voltage conductors 67 and 68 leading from a current source, not shown, are connected to the primary side of a step down transformer 69, the secondary of which is connected to a relay having a winding 70 which controls a set of contacts 71. The stoker motor 7 is connected by means of the contacts 71 directly across the line conductors 67 and 68 for operation. It is customary to operate the stoker automatically in accordance with the demand for heat from the furnace 6. This is commonly provided by a room thermostat indicated generally at 72 which includes a thermostatic element adapted to close a pair of contacts 73 when the temperature of a room in which the thermostat 72 is located is below a predetermined value. The thermostat 72 is also arranged with an indicating means in the form of a lamp 74. The closure of the contacts 73 of the room thermostat results in the operation of the relay 70. It is also customary in stoker installations to provide some means for maintaining the fire alive during intervals when the room thermostat 72 is not calling for heat, such as would occur during mild weather. This means usually takes the form of an interval timer having an electric driving motor 75 arranged for continuous operation by being connected across the line conductors 67—68. The electric motor 75 is provided with a cam member 76 adapted at predetermined adjustable intervals to close the timer contacts 77 arranged in parallel with the room thermostat contacts 73. The switching mechanism 19 and the associated contacts are connected between the room thermostat 72 and the transformer 69.

In describing the normal operation of the stoker system assume that the room thermostat 72 upon a call for heat closes its contacts 73. This results in the establishment of an energizing circuit for relay winding 70 from the secondary of transformer 69 through the contacts 60, 58, 59 and 61 of switch 19, and through the thermostat contacts 73. The signal lamp 74 is short circuited by this circuit path. Relay 70 upon energizing closes its contacts 71 to start the operation of the stoker motor 7. The motor 7 causes the fan 8 to increase the rate of combustion in the retort 17 and at the same time to feed fuel by means of the screw 14 to the retort. When the heat emanating from the furnace 6 is sensed by the thermostat 72 it opens the contacts 73 to stop the motor 7. The interval timer contact 77 upon being closed causes the same operations to be performed. As long as normal operating conditions prevail, the foregoing sequence of events take place indefinitely. When, however, an obstruction occurs in the fuel conveyer screw 14 or in some other place, the feeding of fuel is halted. Since the motor 7 continues to rotate the wheel 12, the trip member 23 is caused to trip in the manner pointed out so that it assumes the position shown in Fig. 6. When this occurs the head 33 and pin 32 are pushed inward by the trip member 23 to the rear side of wheel 12 and held in this position. The wheel 12 rotates until the rear end of pin 32 and its washer 35 engages the apron portion of the switch arm 40, forcing the switch arm 40 inward about pivot 42 so that the button 45 is depressed to cause the armature 48 to be moved out of engagement with the magnet 50. Since the trip member 23 is now out of engagement with the cam 21, the wheel 12 is free to rotate without the load of the gear box 13 and the screw 14. The armature 48 is swung about its pivot 49 and its motion is halted when the projecting portion 55 of the armature forces the lower end of resetting button 56 against the bottom of insulating plate 54. At the same time that the armature 48 is operated the contact leaf spring 57 is snapped from one position to the other, thereby opening the energizing circuit for relay winding 70, causing contacts 58 and 59 to engage fixed contacts 62 and 63 respectively. It will be noted that the indicating lamp 74 was originally short circuited in the normal closed position of contacts 58, 59, 60 and 61 respectively, and since these contacts are now opened the lamp 74 is no longer short circuited and an operating circuit for the lamp is completed extending from the secondary winding of transformer 69, indicating lamp 74, contacts 63, 59, 58 and 62, through the winding of relay 70 back to the transformer. The lamp 74 is energized and serves to indicate the overload condition which must be immediately taken care of if it is desired to maintain heat in the furnace. The lamp 74 is of such resistance as to cause a voltage drop in this circuit which is sufficient to maintain the winding 70 of the relay substantially deenergized, and as a result it opens its contacts 71 causing the stopping of the motor 7. The operation of the fan 8 is halted so that forced combustion in the retort is no longer promoted and the fire 17 will burn as a result of natural draft until it is either completely extinguished or the overload condition remedied. During this time should the room thermostat 72 or the interval timer 75 call for heat no operation would result.

In order to reset the mechanism it is necessary to remove the cause of the overload release and then manually grasp the portion 28 of the trip member 23, pulling it against the tension of spring 29 about pivot 25 until it is again in contact with the cam 21. This conditions the overload mechanism 18 for reoperation. It is next necessary to reset the switching mechanism 19. This is accomplished by momentarily depressing the reset button 56 which causes the armature 48 to be swung about its pivot 49 until its lower end is in engagement with the magnet 50. Upon the operation of the motor 7 as a result of the energization of relay 70 the belt 11 rotates driving wheel 12 until the projecting portion 24 of trip member 23 engages the catch 22, whereupon the cam 21 and shaft 20 of the gear train 13 are rotated with the wheel 12. As a result the stoker screw 14 feeds fuel through the stoker conveyer tube 16 to the retort 17. The apparatus is now in condition for normal operation until an abnormal condition occurs when the sequence of events pointed out will transpire.

With the foregoing arrangement according to the invention the overload mechanism is readily resettable without the necessity of providing complicated arrangements and means for installing shear pins, the motor is stopped automatically from operating and the operation of the fan is likewise halted. No strain upon the mechanism is produced since it is merely necessary to overcome the force exerted by the spring 29 to uncouple the driving mechanism of the motor 7 from the screw feeding means 14. The overload mechanism when tripped is readily resettable and is in a position where this may be readily accomplished. At the same time the operation of the switch mechanism 19 provides a simple and reliable means for accomplishing the stopping of the motor 7 as well as giving an indication at the room thermostat, for example, where it is readily visible, that an overload condition prevails. With this arrangement the stoker does not run indefinitely under overload conditions and the fire is not burned out in the retort since it will burn by natural draft for some time after the fan is stopped.

While the invention has been illustrated and described as being incorporated as an overload release mechanism in a stoker apparatus, it will be readily perceived that it is of broader application. It is therefore to be understood that the invention is not to be limited to the precise structure and elements disclosed but only by the appended claims.

What is claimed is:

1. The combination of, a driving member and a driven member, an overload release connection between said members comprising a resettable trip member on the driving member having releasable engagement with said driven member, said trip member transmitting motive force from the driving member to the driven member, means for tripping said trip member from out of engagement with said driven member upon the occurrence of an overload condition, and means directly actuated by tripping movement of said trip member for stopping the operation of said driving member.

2. The combination of, a driving member and a driven member, an overload release connection between said members comprising a trip member associated with the driving member and a cam member associated with the driven member, flexible means for releasably holding said trip member and said cam member in engagement whereby the driving member operates the driven member through said trip member and cam, the trip member tripping and disengaging the connection between the driving member and the driven member upon the occurrence of an overload condition, a switching mechanism, means actuated by said drive member upon continued movement thereof after tripping of said trip member for operating said switching mechanism, the operation of said switching mechanism causing the driving member to stop, means for resetting the trip member into association with the cam member to establish the connection between the driving member and the driven member, and means for resetting said switching member to cause the driving member to operate.

3. In a system of the class described, the combination of, a power driven device, a prime mover for driving said device, transmission means interposed between said device and said prime mover, said transmission means including a driven member, a release member and a drive member driven by the prime mover, said release member normally transmitting power from the drive member to the driven member but being shiftable to a releasing position in which it is ineffective to transmit power from the drive member to the driven member, a controller for stopping the prime mover, an operating member for said controller carried by said drive member, said operating member when in a first position on the drive member being adapted to actuate said controller by movement of the drive member, while in a second position being inoperative to actuate said controller, and means directly actuated by movement of the release member to releasing position for shifting said operating member from its second position to its first position.

4. In a system of the class described, the combination of, a power driven device, a prime mover for driving said device, transmission means interposed between said device and said prime mover, said transmission means including a driven member, a release member and a drive member driven by the prime mover, said release member normally transmitting power from the drive member to the driven member but being shiftable to a releasing position in which it is ineffective to transmit power from the drive member to the driven member, a controller for stopping the prime mover, an operating member for said controller carried by said drive member, said operating member when in a first position on the drive member being adapted to actuate said controller by movement of the drive member, while in a second position being inoperative to actuate said controller, means directly actuated by movement of the release member to releasing position for shifting said operating member from its second position to its first position, and manual reset means for resetting said release member and for resetting said controller in position to permit operation of the prime mover.

5. In a system of the class described, the combination of, a power driven device, a prime mover for driving said device, transmission means interposed between said device and said prime mover, said transmission means including a driven member, a release member and a drive member driven by the prime mover, said release member being carried by said drive member and transmitting power from the drive member to the driven member, means actuated upon a predetermined resistance to movement of said power driven device for causing movement of said release member to releasing position in which it is ineffective to transmit power from the drive member to the driven member, a controller for stopping the prime mover, an operating member for said controller carried by said drive member, said operating member when in a first position on the drive member being adapted to actuate said controller by movement of the drive member, while in a second position being inoperative to actuate said controller, and means directly actuated by movement of the release member to releasing position for shifting said operating member from its second position to its first position.

6. In a control apparatus of the class described, the combination with a switching mechanism comprising a unitary structure including a casing having an operating member and a resetting member both extending from said casing, an armature member pivoted in said casing and operable by said operating member and by said resetting member the operating member being capable of moving said armature member only in one direction and the resetting member being capable of moving the armature member in only the opposite direction, a magnet in the casing for holding said armature in one of its positions, a spring for holding said armature in the other of its positions, and contact means carried by said armature and supported in said casing, said contact means being engaged and disengaged upon movement of said armature from one of its positions to the other.

7. In a system of the class described, the combination of, a power driven device, an electric motor for driving said device, transmission means interposed between said device and motor, said transmission means including a release member and a drive member driven by the motor, said release member being carried by the drive member, means actuated upon a predetermined resistance to movement of said power driven device for causing movement of said release member to releasing position, a switching mechanism including an operating member therefor, said operating member being moved upon movement of the release member to releasing position for actuating the switching mechanism to stop the motor, said switching mechanism comprising a unitary structure including a casing, the operating member projecting from the casing, a resetting member extending from the casing, an armature member pivoted in said casing and operable by said operating member and by said resetting member the operating member being capable of moving said armature member only in one direction and the resetting member being capable of moving the armature member in only the opposite direction, a magnet in the casing for holding said armature in one of its positions, a spring for holding said armature in the other of its positions, and contact means carried by said armature and supported in said casing, said contact means being engaged and disengaged upon movement of said armature from one of its positions to the other.

HOMER E. MALONE.